United States Patent
McKinley

(10) Patent No.: US 7,420,694 B2
(45) Date of Patent: Sep. 2, 2008

(54) METHOD OF TRACKING A FILE PROCESSING STATUS WITH A FILE NAME

(75) Inventor: Brian McKinley, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 879 days.

(21) Appl. No.: 10/446,708

(22) Filed: May 29, 2003

(65) Prior Publication Data

US 2004/0239977 A1  Dec. 2, 2004

(51) Int. Cl.
*G06K 1/00* (2006.01)
(52) U.S. Cl. .............. 358/1.13; 358/1.15; 358/1.14; 710/19; 719/321; 707/204; 707/205
(58) Field of Classification Search ............. 358/1.13, 358/1.15, 1.14, 1.16; 710/19; 719/321; 707/204, 707/205
See application file for complete search history.

(56) References Cited

U.S. PATENT DOCUMENTS

| | | | |
|---|---|---|---|
| 5,619,623 A * | 4/1997 | Takayanagi et al. ........ 358/1.15 |
| 5,822,565 A * | 10/1998 | DeRosa et al. ................ 703/24 |
| 5,978,560 A | 11/1999 | Tan et al. ..................... 395/114 |
| 5,993,088 A | 11/1999 | Nogay et al. .................. 400/78 |
| 6,295,538 B1 | 9/2001 | Cooper et al. ............... 707/104 |
| 6,373,585 B1 * | 4/2002 | Mastie et al. ............... 358/1.15 |
| 6,515,759 B1 | 2/2003 | Smith ........................ 358/1.15 |
| 6,520,616 B1 | 2/2003 | Parks et al. ................... 347/19 |
| 6,522,420 B1 | 2/2003 | Chadez et al. ............. 358/1.15 |
| 6,785,023 B1 * | 8/2004 | Iida ............................ 358/442 |
| 6,978,297 B1 * | 12/2005 | Piersol ....................... 709/223 |
| 7,095,518 B1 * | 8/2006 | Keeney et al. ............. 358/1.15 |
| 7,136,464 B2 * | 11/2006 | Satomi et al. ............ 379/88.17 |
| 7,180,626 B1 * | 2/2007 | Gassho et al. ................ 358/1.6 |
| 2002/0107653 A1 * | 8/2002 | Kraffert ....................... 702/119 |
| 2004/0246513 A1 * | 12/2004 | McKinley et al. .......... 358/1.14 |

FOREIGN PATENT DOCUMENTS

JP          09006558 A  *  1/1997

* cited by examiner

*Primary Examiner*—Twyler L. Haskins
*Assistant Examiner*—Jacky X Zheng

(57) ABSTRACT

A method of tracking a file processing status with a file name is provided by monitoring the file processing status of a computer readable file being processed, associating a present processing descriptor with a present processing status of the computer readable file, and manipulating the file name of the computer readable file so as to include the present processing descriptor.

24 Claims, 4 Drawing Sheets

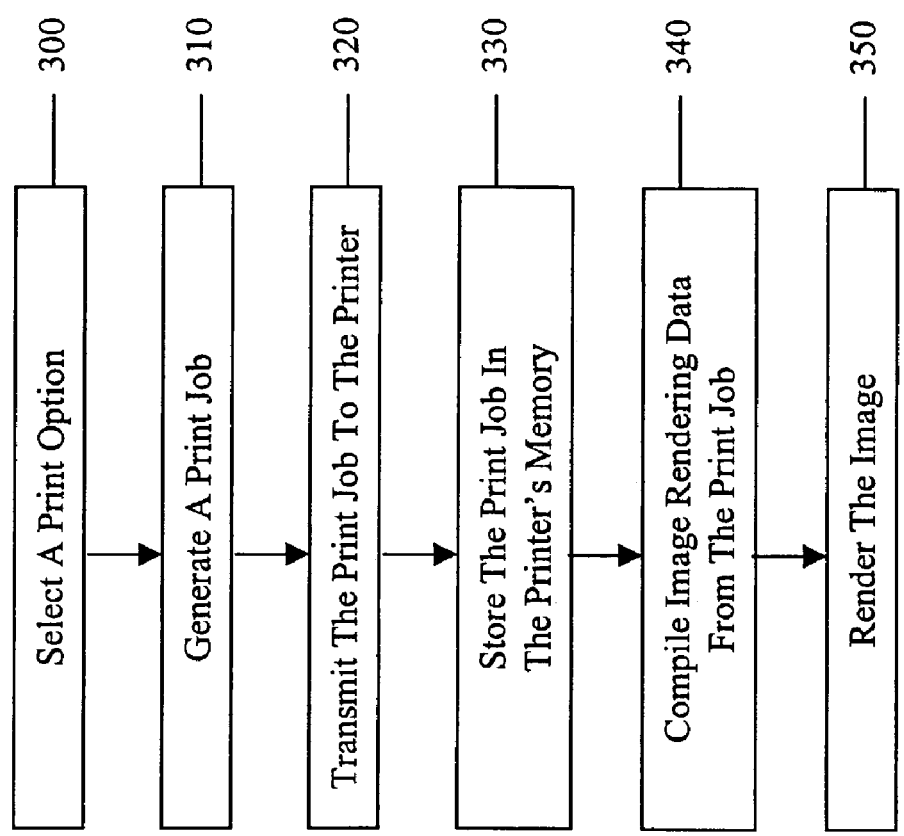
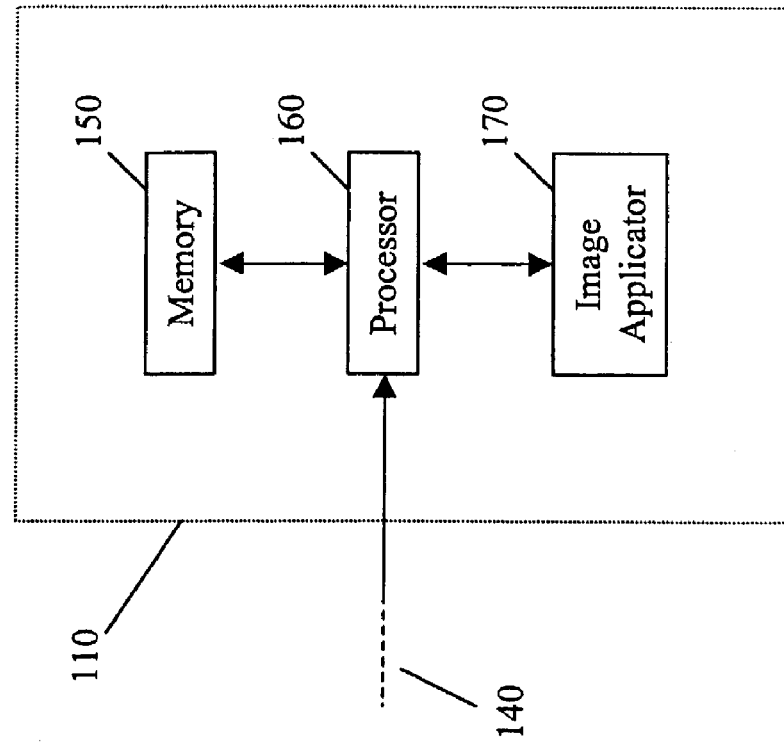

US 7,420,694 B2

METHOD OF TRACKING A FILE PROCESSING STATUS WITH A FILE NAME

BACKGROUND OF THE INVENTION

It is well known to provide a printer for rendering an output from a computer. In operation, a user selects a print option from a software application running on the computer (e.g., a word processor), at which point the software application generates a print job in response to the user selection. A printer driver installed on the computer is used by the computer to compile printer specific image rendering data from the generated print job. The printer specific image rendering data is then sent as a data stream to the printer, which "renders" the image on a media (e.g., paper, transparency, etc.).

At least one problem with conventional printers and conventional printing methods, however, is that they are incapable of tracking and/or conveying a printing status of the printer.

BRIEF DESCRIPTION OF THE DRAWINGS

FIG. 2 is a block diagram of components of the image rendering device of FIG. 1.

FIG. 3 is a flow chart of a method of printing a print job according to an embodiment of the present invention.

DETAILED DESCRIPTION OF THE EMBODIMENTS

Reference will now be made in detail to exemplary embodiments of the invention. Wherever possible, the same reference numbers will be used throughout the drawings to refer to the same or like parts.

The following description will include exemplary embodiments describing image rendering devices. It should be appreciated that the phrase "image rendering device" is intended to include devices that generate a physical image on a media (i.e., an image applicator), such as ink jet printers, laser printers, photocopiers, facsimile machines, etc. Other image rendering devices that do not include image applicators (e.g., scanners) but store a rendered image in a computer readable file can also be used for various embodiments of the present invention, as would be readily apparent to one of ordinary skill in the art after reading this disclosure.

Figure 1:
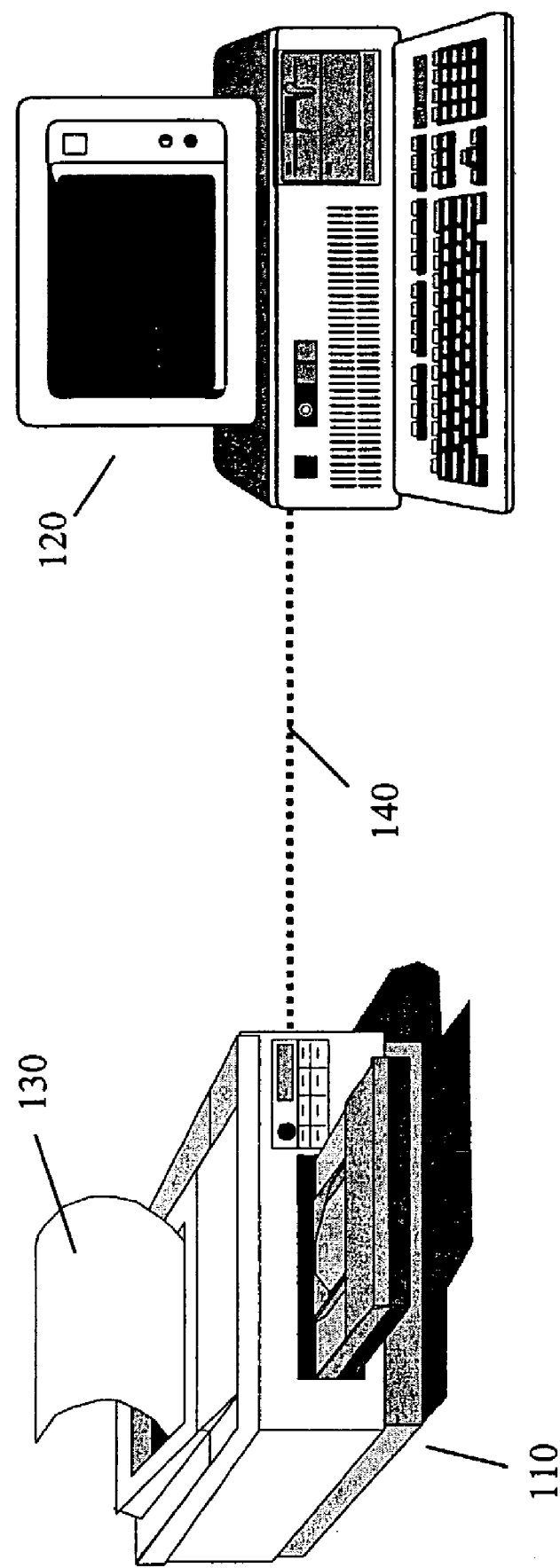
FIG. 1 depicts an image rendering device and a computer according to an embodiment of the present invention.

A printer 110 according to an embodiment of the present invention is shown in FIG. 1. The printer 110 includes an image applicator 170 (FIG. 2), such as a laser printing mechanism or an ink jet print head with an ink cartridge, configured to "render" an image on a media 130. The image applicator 170 is electrically coupled to a processor 160, which is configured to control the image applicator 170 so as to render the image when a print job has been generated by a computer 120 (FIG. 1) coupled via link 140 (e.g., a cable or network connection) to the printer 110. The processor 160 is further programmed to compile image rendering data from the print job, and to update a file name of the print job so as to include a "printing descriptor" of a "present printing status" as will be described in greater detail below.

The processor is also coupled to a memory 150 (FIG. 2), such as a hard disk drive (HDD) or other persistent data storage media, which stores the print job at least while the image applicator 170 renders the image. It should be appreciated that the memory 150 may have a storage capacity substantially larger than the volatile memory found in conventional printers, because the memory 150 is designed to have a storage capacity of sufficient size to store an entire print job. By way of example, the memory 150 may have a storage capacity of at least 20 kilobytes, though it should be appreciated that the actual storage capacity will vary depending on the particular application at hand (e.g., 1 megabyte or greater, 100 megabytes or greater, 1 gigabyte or greater, 10 gigabytes or greater, etc.). Furthermore, software is provided such that the memory 150 can be rewritten or updated.

Operation of the aforementioned printer will now be described in reference to FIG. 3. In step 300, a user selects a print option from a software application running on the computer (e.g., a word processor). Alternatively, a print job may automatically be selected in step 300, such as periodic report generation (e.g., maintenance log) by a network monitoring device. The software application then generates a print job in step 310 in response to step 300.

The generated print job is then transmitted to the printer in step 320, and stored in the printer's memory in step 330. While some formatting may be performed by the computer (e.g., framing the data for transmission to the printer), the image rendering data is compiled by the printer in step 340, rather than by the computer generating the print job in step 310. The compiled image rendering data is then used by the printer to render the image in step 350.

Figure 4:
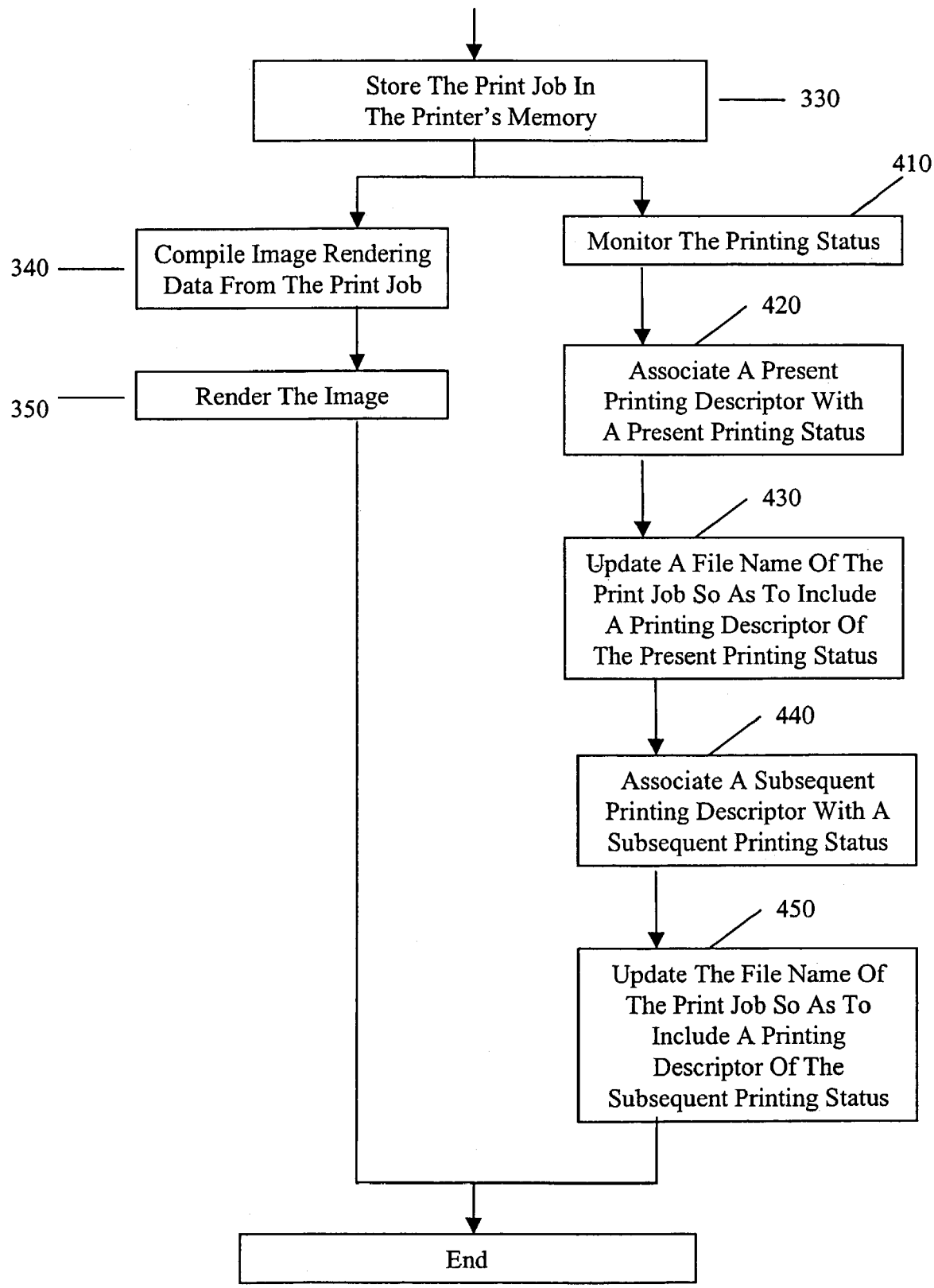
FIG. 4 is a flow chart of a method of tracking a print job processing status according to an embodiment of the present invention.

According to one embodiment of the present invention, the printer additionally tracks a "printing status" of the print job as shown in FIG. 4. More specifically, after the print job has been stored in step 330, the printer monitors the printing status in step 410. Monitoring step 410 may be performed continuously or repeated periodically while the image rendering data is compiled in step 340 and/or the image is rendered in step 350. As shown, monitoring step 410 is typically performed concurrently with both compiling step 340 and rendering step 350.

By way of example, monitoring step 410 may include monitoring the compiling step 340, such that a compiling status (e.g., how far along the printer is in the compiling process, which is part of the overall printing process) is monitored in the monitoring step 410. The printer then associates a present printing descriptor (consistent with that compiling status) with the present printing status in step 420. Hence, for a compiling status, a present printing descriptor may include "submitted for compiling", "compiling initialized", "compiling in progress", and "compiling complete". Once the present printing descriptor has been associated with the present printing status in step 420, the printer then updates the file name of the print job in step 430 so as to include the present printing descriptor of step 420.

As set forth above, the monitoring step 410 may be repeated as the printer continues to compile the image rendering data in step 340 and/or render the image in step 350. Using the previous example, if the compiling step 340 progresses from a present compiling status of "compiling in progress" to a subsequent compiling status of "compiling complete", the printer associates a subsequent printing descriptor (i.e., "compiling complete") with the subsequent printing status in step 440, and updates the file name of the print job in step 450 so as to include the subsequent printing descriptor of step 450. Thus, the term "subsequent" refers to any printing status which occurs after the "present" (i.e., first) printing status.

Figure 5:
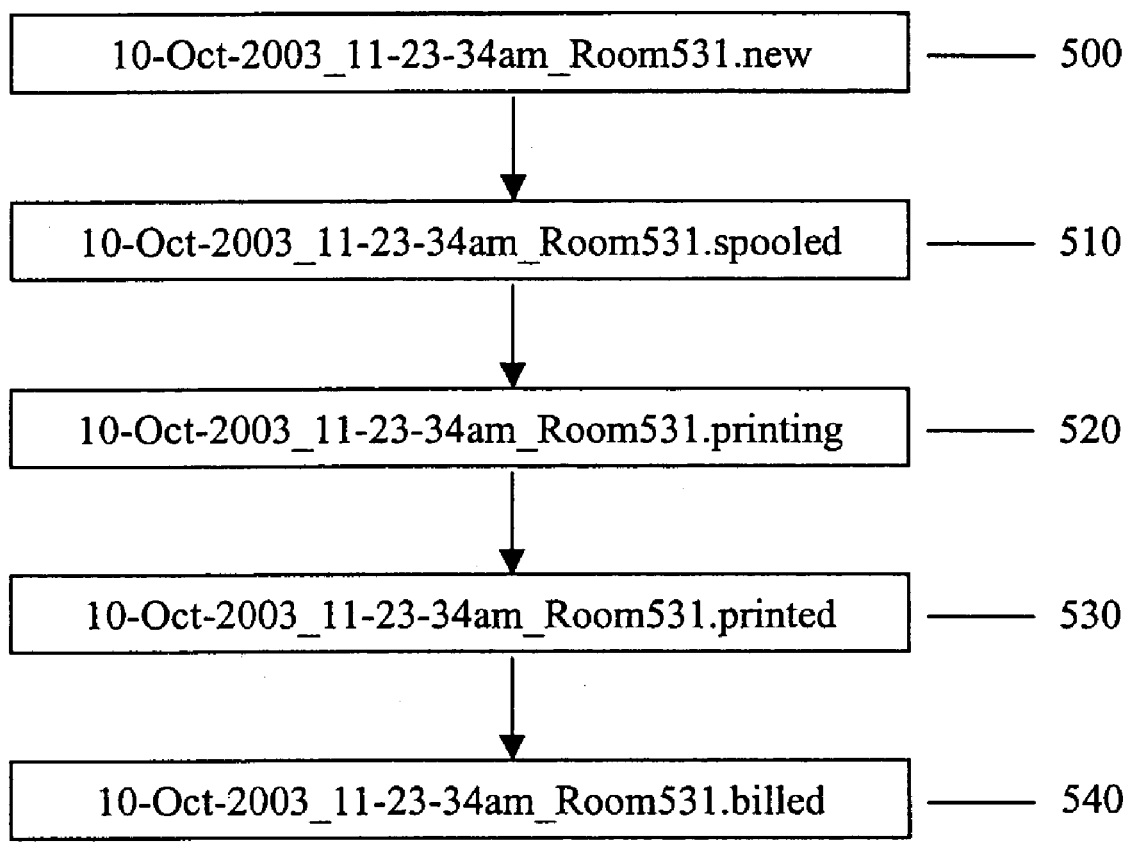
FIG. 5 is a flow chart of a print job file name being updated according to an embodiment of the present invention.

An exemplary file naming progression for a print job being printed in accordance with the previous embodiment, is shown in the block diagram of FIG. 5. As shown, the printing status descriptor may stored as part of a file extension, such as "new" in 500, "spooled" in 510, "printing" in 520, "printed" in 530, and "billed" in 540. Alternatively, the printing status descriptor may be stored as part of the main file name portion, such as "10-Oct-2003" representing a date the print job was submitted, and "11-23-34am" representing a time the print job was submitted. The present printing status descriptor may be replaced by subsequent printing status descriptors (see progression in the file extension from "new" in 500 to "billed" in 540), or may be concatenated with subsequent descriptors (see inclusion of both "10-Oct-2003" and "11-23-34am").

According to one embodiment of the present invention, the file name may also be updated to include non-printing status descriptors. By way of example, an identification of a print job submitter (e.g., "Room 531"), a print job priority, a print job distribution list, a billing code, or a print job archive history/version number may be included. Other non-printing status descriptors may also be used, as would be readily apparent to one of ordinary skill in the art after reading this disclosure.

It should be appreciated that the printing status descriptor and/or non-printing status descriptor can be generated by the printer itself, or retrieved from a memory in the printer, or obtained in some other convenient manner. By way of example, the printer may include a clock, and may correlate a time the print job is received with the print job file. The printer can then generate a printing status descriptor, such as a time the print job was received (e.g., "11-23-34am").

According to one embodiment of the present invention, the aforementioned printing descriptor can be monitored for processing requirements in addition to the physical imaging. By way of example, a network server monitoring the printing of an item (i.e., "printed" in 530 of FIG. 5) may determine that the print job needs to be billed (i.e., a processing requirement) after the print job has "printed" by monitoring the file extension to determine when the print job has completed. The network printer may then cause the printer to update the file name to "billed", thereby indicating that the appropriate billing has been processed and completed.

Similarly, a network server monitoring the printing of an item may schedule various print jobs to different printers on a network based on how far along a given printer is in printing the item. By way of example, if a given printer is in a "spooled" status thereby indicating the print job is relatively early on in the printing process, the network server may transmit the next print job to a different printer (e.g., one where the most recent print job has a "printed" present processing descriptor).

Additionally, a non-printing status descriptor can be used by the printer for various processing requirements. By way of example, a print job priority (e.g., "high", "normal", "low", etc.) may be included as part of the file name when the print job is transmitted to the printer (see step 320 in FIG. 3), such that the printer prints high priority items before normal and low priority items. Similarly, the printer can be programmed to prioritize certain print job submitters over others (e.g., a manager's print job over a clerical print job), the print job submitter information (e.g., "Room 531" in FIG. 5) being included as part of the file name of the print job.

A printer including one or more of the aforementioned features thus allows for tracking a printing status with a file name of a print job. Hence, data related to a print job can be stored and tracked without having to maintain a separate table of job metadata and without storing metadata in a separate companion file next to the print data file. Additionally, specialized components in the print service can perform their print job processing tasks independently by each monitoring the file name or by having the printer automatically transmit information to the specialized component when a particular status is reached. By way of example, specialized components may monitor the file name to identify the need to print, bill, or delete the print job or to perform other processing tasks, such as exporting information about the job to support personnel or a network server. Other features and advantages are also plausible, as would be readily apparent to one of ordinary skill in the art after reading this disclosure. See, for example, co-pending application entitled "Method And Apparatus For Crash Recovery On An Image Forming Apparatus", by Brian McKinley et. al., filed the same day as the present application, which is incorporated by reference herein in its entirety.

The foregoing description of various embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. Hence, additional applications, such as scanners, may also benefit from tracking a file processing status with a file name.

What is claimed is:

1. A method for tracking a file processing status with file name, comprising:

manipulating the file name of a computer readable file being processed so that a file extension of the file name includes a present processing descriptor associated with a present processing status of the computer readable file; and manipulating the file name includes a present processing descriptor associated with a present processing status of the computer readable file so that the file extension of the file name includes a subsequent processing descriptor associated with a subsequent processing status of the computer readable file, by concatenating the subsequent processing descriptor with the present processing descriptor.

2. The method of claim 1, further comprising:

storing the computer readable file in a memory prior to manipulating the file name of the computer readable file so as to include the present processing descriptor.

3. The method of claim 1, further comprising at least one of:

generating the present processing descriptor; and retrieving the present processing descriptor from a memory.

4. The method of claim 1, further comprising:

determining a processing requirement from the present processing descriptor in the file name, the processing requirement comprising whether billing for processing of the file has been accomplished; and processing the computer readable file based on the processing requirement.

5. The method of claim 1, wherein the computer readable file comprises a print job.

6. The method of claim 5, wherein the present processing status comprises a print job status.

7. The method of claim 5, further comprising: compiling the print job on a printer.

8. An image rendering device, comprising:
an image applicator configured to render an image from image rendering data; and
a processor programmed to:
manipulate a file name of the computer readable file so that a file extension of the file name includes a present rendering descriptor of a present image rendering status;
manipulate the file name includes a present rendering descriptor of a present image rendering status of the computer readable file so that the file extension of the file name includes a subsequent rendering descriptor of a subsequent image rendering status by concatenating the subsequent rendering descriptor with the present rendering descriptor,
wherein the subsequent image rendering status occurs after the present image rendering status has completed.

9. The image rendering device of claim 8, wherein the processor is further programmed to:
determine a processing requirement from the present rendering descriptor in the file name, the processing requirement comprising whether billing for processing of the file has been accomplished; and
process the computer readable file based on the processing requirement.

10. The image rendering device of claim 8, further comprising:
a memory for storing the computer readable file at least while the image applicator renders the image.

11. The image rendering device of claim 8, further comprising:
a transmitter configured to export the present image rendering status to an external device.

12. The image rendering device of claim 8, wherein the image rendering device is one of a printer, a photocopier, and a facsimile machine.

13. The image rendering device of claim 8, wherein the computer readable file comprises a print job.

14. The image rendering device of claim 8, wherein the present rendering status comprises a print job status.

15. The image rendering device of claim 8, wherein the processor is programmed to manipulate the file name of the computer readable file so to include the present image rendering status as a file extension of the file name.

16. A printer, comprising:
a memory configured to store a received print job;
a processor programmed to:
update a file extension of a file name of the print job so as to include a printing descriptor of a present printing status and to include a subsequent printing descriptor of a subsequent printing status, by concatenating the subsequent printing descriptor with the present printing descriptor; and
an image applicator configured to render an image from the image rendering data.

17. The printer of claim 16, wherein the printing descriptor comprises at least one of
a time the print job was submitted;
a time the print job was completed;
a time the print job was last updated;
a print job spooling status; and
a print job billing status, the print job billing status comprising whether billing for processing of the file has been accomplished.

18. The printer of claim 16, wherein the file name further includes at least one of
an identification of a print job submitter;
a print job priority;
a print job archive history; and
a processing failure notification.

19. The printer of claim 16, wherein the processor is further programmed to:
determine a processing requirement for the print job, the processing requirement comprising whether billing for processing of the file has been accomplished; and
process the print job based on the processing requirement.

20. The printer of claim 19, wherein the processing requirement comprises a print job priority.

21. A computer-readable medium having a computer program stored thereon for causing a printer to perform the following method steps of:
updating a file extension of a file name of a print job so as to include a printing descriptor of a present printing status and to include a subsequent printing descriptor of a subsequent printing status, by concatenating the subsequent printing descriptor with the present printing descriptor; and
rendering an image from the image rendering data.

22. The medium of claim 21, wherein the printing descriptor comprises at least one of:
a time the print job was submitted;
a time the print job was completed;
a time the print job was last updated;
a print job spooling status; and
a print job billing status, the print job billing status comprising whether billing for processing of the file has been accomplished.

23. The medium of claim 21, wherein the file name further includes at least one of
an identification of a print job submitter;
a print job priority;
a print job archive history;
a processing failure notification.

24. An image forming apparatus, comprising:
means for updating a file extension of a file name of a print job so as to include a printing descriptor of a present printing status and to include a subsequent printing descriptor of a subsequent printing status, by concatenating the subsequent printing descriptor with the present printing descriptor; and
means for rendering an image from the image rendering data.

* * * * *

UNITED STATES PATENT AND TRADEMARK OFFICE
CERTIFICATE OF CORRECTION

PATENT NO. : 7,420,694 B2  Page 1 of 1
APPLICATION NO. : 10/446708
DATED : September 2, 2008
INVENTOR(S) : Brian McKinley It is certified that error appears in the above-identified patent and that said Letters Patent is hereby corrected as shown below:

In column 4, line 35, in Claim 1, after "with" insert -- a --.

In column 6, line 2, in Claim 17, after "one of" insert -- : --.

In column 6, line 11, in Claim 18, after "one of" insert -- : --.

In column 6, line 44, in Claim 23, after "one of" insert -- : --.

Signed and Sealed this

Eleventh Day of August, 2009

David J. Kappos
*Director of the United States Patent and Trademark Office*